March 10, 1925.  S. H. WISMER  1,529,050
MOTOR MECHANISM
Filed Jan. 31, 1924  2 Sheets-Sheet 2
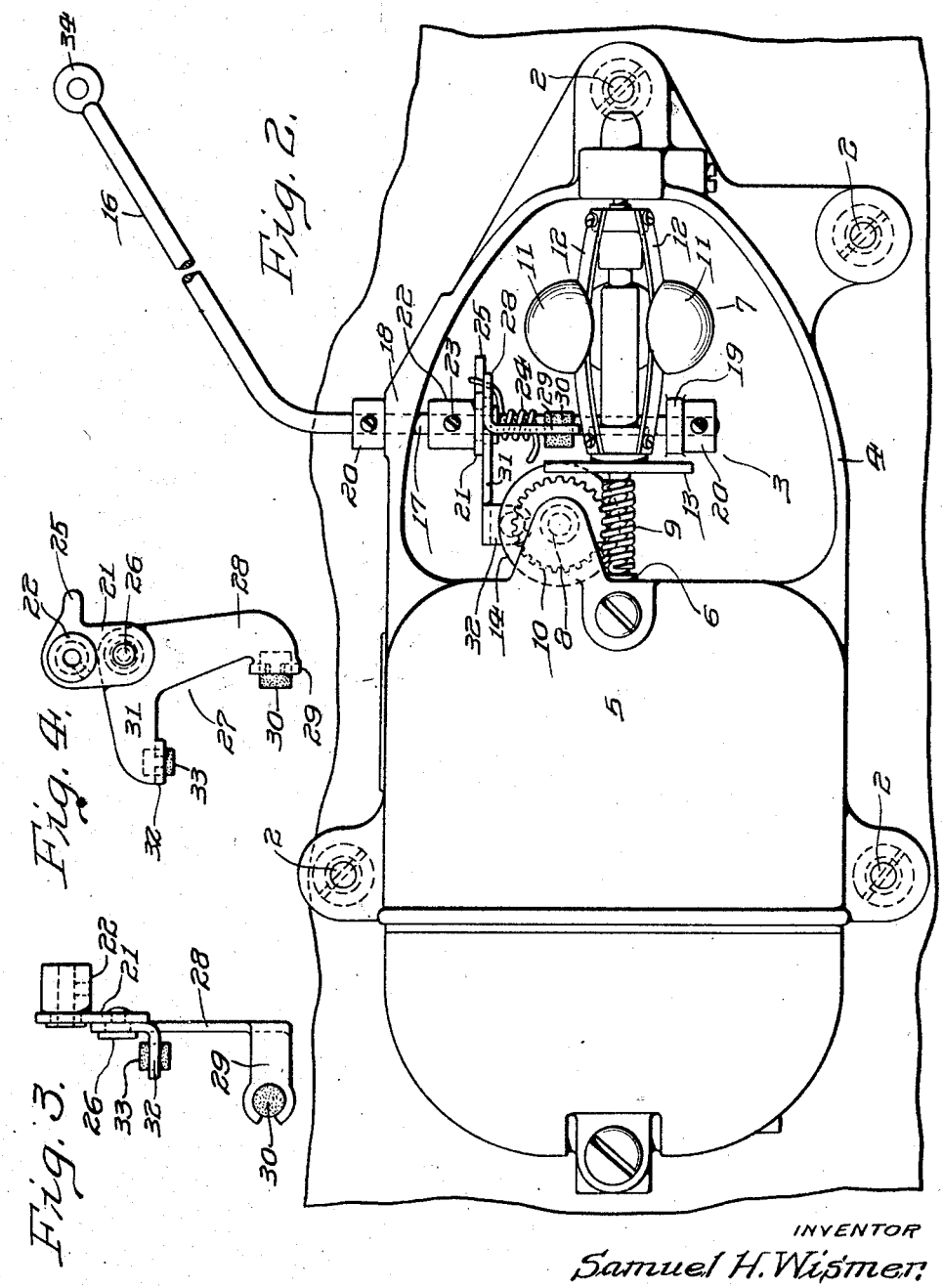
INVENTOR
Samuel H. Wismer
WITNESS
BY Anderson & Moulton
ATTORNEYS Patented Mar. 10, 1925.

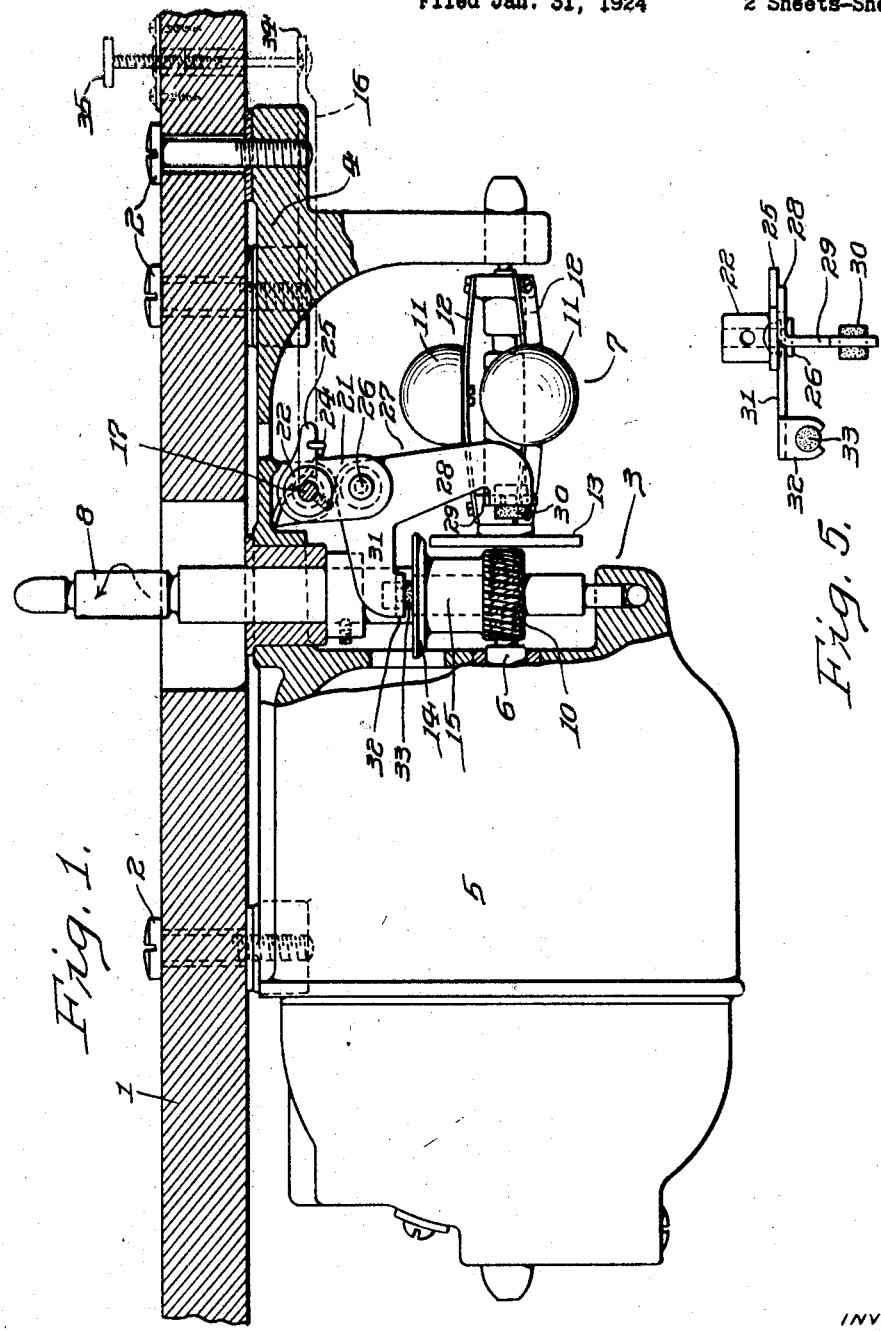

1,529,050

UNITED STATES PATENT OFFICE.

SAMUEL H. WISMER, OF PALMYRA, NEW JERSEY, ASSIGNOR TO VICTOR TALKING MACHINE COMPANY, A CORPORATION OF NEW JERSEY.

MOTOR MECHANISM.

Application filed January 31, 1924. Serial No. 689,836.

*To all whom it may concern:*

Be it known that I, SAMUEL H. WISMER, a citizen of the United States, and a resident of Palmyra, in the county of Burlington and State of New Jersey, have invented certain new and useful Improvements in Motor Mechanisms, of which the following is a specification.

My invention relates to motor mechanisms and more particularly to those motors which are used in talking machines to rotate the record during the reproduction of sound therefrom.

Talking machine motors comprise, in general, a frame or plate upon which the motor parts are mounted, a power element, such as a spring motor or electric motor, a spindle driven through suitable gearing from the power element and a governing mechanism for maintaining constant the speed of the spindle (upon which is mounted the turntable) during the reproduction of sound from a record rotated by said spindle. Thus, the talking machine motor as a whole, may be considered as including or containing a driving motor, particularly when an electric motor is used as the power element. In somewhat the same sense the spring barrels and driving gear of a spring motor may be referred to as a power element or motor when the talking machine motor is a spring driven motor.

When the power element of a talking machine motor is a spring motor, such spring motor usually runs at relatively low speeds and the governor mechanism is usually mounted on a governor shaft driven at a comparatively high speed from the spring motor. When the power element of a talking machine motor is an electric motor, however, the speed at which the electric motor runs is relatively high as compared with the speed of a turntable or the speed of a spring motor and shaft; in such constructions the centrifugal governing mechanism may be mounted directly on the main or power shaft of the electric motor to rotate at the same speed as that of the main or power shaft of the electric motor.

The objects of my invention are to provide a high speed power element of a talking machine motor with a speed controlling and regulating device which is very sensitive and responsive to slight changes in the speed of the rotation of the high speed motor and which operates to apply braking or speed retarding friction simultaneously at two points in the moving parts of a talking machine motor, namely, (1) on the governor disc, the position of which varies with the variations in the speed of the motor, and (2) on the turntable spindle which is geared to and is driven by the power shaft of the high speed motor.

A further object of my invention is to provide a brake pad or shoe which cooperates with the turntable spindle or with a disc carried by and rotating with said spindle, and to vary the friction therebetween simultaneously with the variation in the pressure between the friction pad or element of the governor mechanism and the governor disc thereof, all for the purpose of varying the speed controlling and regulating friction quickly and effectively.

A further object of my invention is to apply regulating and braking friction on both sides of the gearing which transmits motion from the driving shaft of the motor to the turntable shaft or spindle.

A further object of my invention is to keep the teeth of the gearing between the power shaft and the spindle in constant driving contact or relation and to prevent any tendency of the spindle to run ahead of or faster than the spindle when the speed of the power element is reduced or retarded for any reason.

A further object of my invention is to provide the governor mechanism with a second friction pad or surface which continually applies a light speed retarding friction to the spindle of a talking machine motor, and to vary and control the said friction on the said turntable spindle by and with the application of speed controlling friction to the disc of the governor mechanism.

Other objects of my invention will appear in the specification and claims below.

Referring now to the drawings forming a part of this specification and in which the same reference characters are used throughout the various views to designate the same parts, Fig. 1 is a side elevational view, partly in section, of a talking machine motor; the power element of which is an electric motor and the speed controlling and governing device of which is a centrifugal governor mechanism mounted directly upon the electric motor or power spindle to rotate with said spindle at the same speed as that of said spindle.

Fig. 2 is a plan view of the bottom of the talking machine motor shown in Fig. 1.

Fig. 3 is an end elevational view of the friction applying levers of the governor mechanism.

Fig. 4 is a side elevational view of the levers shown in Fig. 3, and

Fig. 5 is a bottom plan view of the levers shown in Figs. 3 and 4.

In Figs. 1 and 2 is shown a fragment of a motor-board or partition 1, to the under side of which is fastened, as with screws or bolts 2, the talking machine motor 3, which comprises the motor frame 4, the power element, which is an electric motor, 5, having a main or power or driving shaft 6, a centrifugal governor mechanism 7 and a turntable spindle 8 all mounted on or in the motor frame 4 and carried thereby. The main or power shaft 6 is preferably provided with a worm or skew gear 9 which meshes directly into the teeth of a worm gear or skew gear 10 rigidly secured to the turntable spindle 8. The turntable spindle 8 is thus geared directly to and is driven directly by the main or power shaft 6 by the gearing 9—10 which effects the necessary reduction in speed between the shaft 6 and the spindle 8.

The fly balls 11, the springs 12 and the governor disc 13 are mounted directly on and rotated at the same speed as the main or driving shaft 6 of the electric motor 5. The axes of the shaft 6 and of the spindle 8 may and preferably do lie in planes normal to each other.

Rigidly secured to the spindle 8 is a disc 14 which may be and preferably is integral with the hub 15 of the worm gear 10.

The speed regulating or controlling lever 16 is preferably integral with the rock shaft 17 which is mounted in bearings 18—19 on the motor frame 4. The rock shaft 17 may be prevented from longitudinal movement in said bearings 18—19 by collars 20—20 rigidly secured to said rock shaft 17 adjacent said bearings 18 and 19 respectively. Rigidly mounted on the rock shaft 17 between the bearings 18—19 is an arm or lever 21 having a hub 22 provided with a set screw 23 for clamping or holding the hub 22 rigid with respect to said rock shaft. Coiled around the rock shaft 17 is a coil spring 24, one end of which presses against the underside of the motor frame and the other end of which may hook under or bear against an arm 25 on the lever 21. The tension of the spring 24 is such as to tend to turn the rock shaft 17 counter-clockwise when looked at in the position shown in Fig. 1 and tends to move the free end of the lever 21 away from the axis of the spindle 8.

Mounted on the free end of the arm or lever 21 on a pivot is a bell crank lever 27, one arm 28 of which extends downwardly and is provided at its free end with an offset portion 29 provided with a friction pad 30 adapted to cooperate with the governor disc of the governor mechanism 7.

The other arm 31 of the bell crank lever 27 extends horizontally toward the motor 5 and its free end is provided with an offset portion 32 which carries a friction pad 33 adapted to lie lightly on the upper side of the brake disc 14 on the spindle 8.

The tip or free end 34 of the lever 16 is adapted to be adjusted to different positions by an adjusting screw 35 mounted in and projecting below the under surface of the motor board 1. The end 34 of the lever 16 is thus held pressed upwardly against the lower end of the adjusting screw 35 by the coil spring 24. It will readily be seen that the position of the friction pad 30 may be adjusted with respect to the governor disc 13 by turning the adjusting screw 35 to raise or lower the free end of the controlling lever 16.

The operation of the device is as follows.

Assuming the motor 5 to be not operating, as shown in Figs. 1 and 2, the motor is started by applying the electric current to the said motor 5, thereby causing the shaft 6 carrying with it the fly-balls 11 to revolve. These fly-balls under the influence of the centrifugal force developed therein, flex the springs 12 outwardly as the speed increases and draw the rotating governor disc 13 to the right, (when the device is viewed in the position shown in Fig. 1), outwardly or away from the motor 5. This outward movement of the governor disc continues as the speed of the motor increases until the governor disc comes into contact with the governor pad 30. Any further tendency of the governor disc to continue to move outwardly, increases the pressure between the disk 13 and the pad 30, producing a friction which effects a braking or retarding action on the disc 13 and the shaft 6 upon which the governor disc 13 is mounted.

Under running conditions then, the governor disc 13 rests or bears against the governor pad 30, but this pad 30 is on the end of the arm 28 of the pivoted bell crank lever 27 and therefore the pressure of the governor disc 13 against the pad 30 tends to rock the bell crank lever 28 on its pivot 26 and presses the brake pad 33 against the disc 14 on the spindle 8. Thus friction tending to maintain constant the speed of the motor is applied continuously simultaneously at two points, namely, on the governor disc 13 and on the brake disc 14 on the spindle 8.

Because the pad 33 on the arm 31 of the bell crank lever 27 is thus pressed against the disc 14 on the spindle the friction therebetween tends to continually hold the teeth of the gear 10 on the spindle in constant contact or engagement with the driving faces of the teeth or threads of the gear or worm 9 on the driving shaft 6 and to take up any backlash between the spindle gear 10 and the worm 9.

With electric motors driven by ordinary lighting circuits, as most talking machine electric motors are, the changes in the current tend to greatly affect the speed of the electric motor. If the voltage of the current suddenly increases, the speed of the motor instantly responds causing the governor disc 13 to press harder against the friction pad 30 and consequently causing the pad 33 to bear the harder against the disc 14 on the spindle and to thus almost immediately counteract or prevent the speed of the motor from being substantially increased. Similarly, if the voltage on the electric current decreases, the pressure between the governor disc 13 and the pad 30 immediately decreases and the pressure between the disc 14 and the pad 33 correspondingly decreases, thus permitting the motor to maintain its speed notwithstanding the drop in the current. Any tendency of the motor shaft on the electric motor to vary its speed is substantially instantly transmitted to the bell crank lever 27 and effects a substantially instant corresponding increase or decrease in the friction applied to the governor disc and to the spindle depending upon whether the tendency of the motor is to speed up or to decrease in speed.

The turntable of a talking machine is rather large and acts like a balance wheel to prevent sudden changes in the speed of the turntable. Its momentum is considerable. When, therefore, the tendency of the motor is to decrease its speed due for instance to a sudden decrease in the amount of current supplied thereto, there would be a tendency of the spindle to run ahead of the gear on the driving shaft 6. The application of braking friction to the spindle simultaneously with the application of friction to the governor disc 13 tends to prevent this tendency of the teeth of the gears 9 and 10 to separate under such conditions. The pad 33 continually applies friction to the spindle disc 14 and thus continually tends to retard the speed of the spindle.

In the foregoing specification my invention has been described as applied to governing and braking mechanisms wherein a controlling or regulating friction between friction pads and friction discs is utilized to vary and control the speed of the motor, but my invention is not to be construed as being limited strictly thereto, since other forms of moving friction surfaces and other forms of relatively stationary but adjustable friction surfaces cooperating therewith are fully within the aim and scope of my invention, when constructed, arranged and disposed to operate in substantially the same manner as does my invention, and as is set forth in the appended claims.

Having thus described my invention, what I claim and desire to protect by Letters Patent is:

1. In a talking machine motor, the combination of a driving shaft, a governor disc mounted thereon and movable longitudinally thereof to different positions depending upon the speed of said shaft, a turntable spindle geared to said shaft, and means cooperating with said governor disc and said spindle to continuously apply a braking friction to said spindle and to vary said friction on said spindle by and in accordance with the pressure between said governor disc and said means.

2. In a talking machine motor, the combination of a driving shaft, a governor disc mounted thereon and movable longitudinally thereof to different positions depending upon the speed of said shaft, a turntable spindle, gearing between said shaft and said spindle whereby said spindle is driven by said shaft, and means cooperating with said governor disc to continuously apply a braking friction to said spindle and to vary the friction between said means and said spindle by and in accordance with the pressure between said governor disc and said means.

3. In a talking machine motor, the combination of a driving shaft, a governor disc mounted thereon and movable longitudinally thereof to different positions depending upon the speed of said shaft, a friction pad cooperating therewith, a turntable spindle, gearing between said shaft and said spindle whereby said spindle is driven by said shaft, a friction pad bearing against said spindle at all times to exert a braking action thereon, and means to vary the pressure between said spindle and the pad cooperating therewith by and in accordance with the pressure between said governor disc and the pad cooperating therewith.

4. In a talking machine motor, the combination with a driving shaft, a centrifugal governor mounted on and revolving with said shaft and comprising a rotating member having a smooth surface, and a turntable spindle driven by said shaft, of a brake member rigid with said spindle and having a smooth surface, a lever of the first order having its ends respectively adjacent said smooth surfaces and a pair of friction applying members mounted respectively on the ends of said lever and engaging said smooth surfaces respectively when said shaft revolves, whereby any variation in the pressure between the rotating member of said governor and the friction applying member cooperating therewith, correspondingly varies the pressure between said brake member on said spindle and the friction applying member cooperating therewith.

5. In a talking machine motor, the combination of a driving shaft, a centrifugal governor mounted on and revolving with said shaft and including a governor disc longitudinally movable on said shaft to different positions depending upon the speed at which said shaft is rotated, a turntable spindle driven by said driving shaft and having its axis in a plane transverse to the axis of said driving shaft, a brake disc rigid with said spindle, a bell-crank lever having its ends respectively adjacent said discs, and a pair of friction pads mounted on the opposite arms respectively of said lever and in engagement with said discs when said shaft is revolving at normal speeds, whereby any variation in the speed of said driving shaft varies the pressure between said governor disc and the adjacent pad, and correspondingly varies the pressure between the other pad and the friction disc on said spindle.

6. In a talking machine motor, the combination of an electric motor shaft, a centrifugal governor mounted on and rotating with said shaft and including a governor disc longitudinally movable on said shaft to different positions depending upon the speed at which said shaft is rotating, a turntable spindle geared directly to said motor shaft, a brake disc on said spindle, a pivoted lever, a pair of friction pads respectively carried by said lever on opposite sides of the pivot thereof and positioned respectively adjacent said discs, and means to change the position of the fulcrum of said lever to vary the position of said pads with respect to said discs.

7. In a talking machine motor, the combination with an electric motor having a main driving shaft, of a governor disc mounted on said driving shaft, and longitudinally movable thereon to different positions depending upon the speed at which said shaft is rotating, a turntable spindle geared directly to said driving shaft, a brake disc rigid with said spindle, a pivoted lever, a pair of friction pads mounted on said lever, one on each side of the pivot of said lever and respectively adjacent said discs, and means to bodily adjust the position of said lever to vary and adjust the speed of said electric motor.

8. In a talking machine motor, the combination of a driving shaft, a governor disc rotatable with and longitudinally movable on said shaft to different positions depending upon the speed at which said shaft is rotating, a turntable spindle geared directly to said driving shaft, a disc rigid with said spindle, a lever pivoted between the ends thereof and having two arms respectively adjacent said discs, and a pair of friction pads mounted on the arms of said lever and respectively adjacent a flat face of said discs, whereby any slight variation in the speed of said driving shaft will vary the pressure between said governor disc and the pad adjacent thereto and will correspondingly vary the pressure between the other pad and the friction disc on said spindle.

9. In a talking machine motor, the combination of a driving shaft, a governor disc longitudinally movable on said shaft to different positions depending upon the speed at which said shaft is revolving, a turntable spindle geared directly to said driving shaft and having its axis in a plane transverse to the driving shaft, a brake disc rigid with said spindle, a pivoted member provided with arms respectively adjacent said discs, an oscillatory member on which said pivoted member is pivotally mounted, and a pair of friction pads respectively mounted on said arms and touching said discs when said driving shaft is running normally, and means to adjust the position of said oscillatory member, the movement of said oscillatory member in one direction being operative to increase the friction between said discs and pads and in the opposite direction to decrease said friction.

In witness whereof, I have hereunto set my hand this 29th day of January, 1924.

SAMUEL H. WISMER.